(12) United States Patent
Plazonic et al.

(10) Patent No.: US 10,370,137 B2
(45) Date of Patent: Aug. 6, 2019

(54) METHOD AND DEVICE FOR MONITORING A LABELING PROCESS

(71) Applicant: HENKEL AG & CO. KGAA, Duesseldorf (DE)

(72) Inventors: Goran Plazonic, Belgrade (RS); Dejan Odadzic, Zrenjanin (RS)

(73) Assignee: HENKEL AG & CO. KGAA, Duesseldorf (DE)

( * ) Notice: Subject to any disclaimer, the term of this patent is extended or adjusted under 35 U.S.C. 154(b) by 122 days.

(21) Appl. No.: 15/461,070

(22) Filed: Mar. 16, 2017

(65) Prior Publication Data

US 2017/0183117 A1    Jun. 29, 2017

Related U.S. Application Data

(63) Continuation of application No. PCT/EP2015/070597, filed on Sep. 9, 2015.

(30) Foreign Application Priority Data

Sep. 18, 2014 (EP) .................................... 14185286

(51) Int. Cl.
*B65C 9/40* (2006.01)
*G05B 15/02* (2006.01)

(52) U.S. Cl.
CPC .............. *B65C 9/40* (2013.01); *G05B 15/02* (2013.01); *B65C 2009/402* (2013.01)

(58) Field of Classification Search
CPC ........ B65C 9/40; B65C 9/42; B65C 2009/402
See application file for complete search history.

(56) References Cited

U.S. PATENT DOCUMENTS

| 6,887,333 | B1 | 5/2005 | Kessler et al. |
| 2012/0216951 | A1* | 8/2012 | Kian ................... B32B 37/06 |
| | | | 156/273.3 |

FOREIGN PATENT DOCUMENTS

| CN | 102372100 A | 3/2012 |
| DE | 4137319 A1 | 5/1993 |
| DE | 29620763 U1 | 2/1997 |
| DE | 102006049981 A1 | 4/2008 |
| DE | 102008049830 A1 | 4/2010 |
| DE | 102011017448 A1 | 10/2012 |
| EP | 1792663 A2 | 6/2007 |
| JP | 2008201452 A | 9/2008 |

* cited by examiner

*Primary Examiner* — Toan M Le
(74) *Attorney, Agent, or Firm* — Sun Hee Lehmann

(57) ABSTRACT

A method for monitoring a labeling process, characterized in that parameters of the adhesive used for labeling and/or of the objects (306) to be labeled and/or of the environmental conditions of the environment of the labeling process are recorded, wherein the recorded parameters are processed by a control device (100) comprising a data processing system (101) in a given time interval or continuously and are matched with corresponding desired values, wherein said corresponding desired values can be changed via an input interface (104, 109) and wherein deviations between the recorded parameters and the desired values detected by the data processing system are output via an output interface (103) to an external device (200).

15 Claims, 3 Drawing Sheets

METHOD AND DEVICE FOR MONITORING A LABELING PROCESS

FIELD OF THE INVENTION

The invention relates to a method and a device for monitoring of a labeling process.

BACKGROUND OF THE INVENTION

In practice, it is known to monitor industrial processes like labelling processes to get information about the consumption of consumable supplies like e.g. adhesive. The machine operator can adjust the amount of adhesive to be fed with such determined information so that a sufficient adhesive is used for the labelling process.

DE4137319 A1 discloses a method and a device for monitoring of a labeling machine to get information about the adhesive consumption. This is done by recording the number of items passing through the labeling machine as well as the amount of consumed adhesive during the same period of time. From the detected values, an adhesive consumption can be specified.

DE102008049830 A1 discloses a further method for the determination of adhesive consumption of a cold-adhesive labeling machine for labeling containers with labels, wherein the consumption of adhesive is determined by a measuring device during the labeling process continuously and a normalized adhesive consumption, i.e. the consumption of glue for a certain number of labels, is calculated using the processed data in a time interval labels and a surface Masses of the labels.

Both disclosures provide a possibility to monitor the adhesive consumption of the labelling machine to adjust the amount of fed adhesive.

EP1792663 A1 discloses a delivery device which can be used in an application system, for the processing of low temperature hot melt adhesive comprising a melt tank for the adhesive as well as heating elements and an auto feed device integrally connected to the tank. This delivery device is a closed system for automatically processing and application of an adhesive and can be used in an application system for the adhesive. It could also be used for an upgrade of older application systems. But the delivery device provides no possibility to monitor the amount of dispensed adhesive or to monitor any characteristics of the adhesive.

German Utility Model No. 296 20 763.2 describes an application system which consists of an adhesive reservoir, a feed pump and an applicator head comprising at least one applicator nozzle. The adhesive reservoir, the feed pump and the applicator head are connected by a pipe carrying the adhesive. At least one sensor for the adhesive volume flow rate between the feed pump and the at least one applicator nozzle is provided. The function of this sensor for the adhesive volume flow rate is to measure the volume of adhesive actually delivered by the feed pump to at least one applicator nozzle. If in the course of a work cycle the sensor should detect that not enough adhesive, if any, is being delivered, a corresponding monitoring circuit triggers an immediate interruption in production readily discernible to the machine attendant. The application system does not comprise a closed delivery device therefore any upgrade of the application system could be very expensive.

SUMMARY OF THE INVENTION

Object of the invention is to provide a method and device for improved monitoring of a labeling process.

The mentioned object is solved with the invention described with the features of claim 1.

Advantageous embodiments of the invention are described with the dependent claims.

The invention overcomes the identified disadvantages and solves the mentioned object by providing a method for monitoring a labeling process, wherein parameters of the adhesive used for labeling and/or of the objects to be labeled and/or of the environmental conditions of the environment of the labeling process are recorded, wherein the recorded parameters are processed by a control device comprising a data processing system in a given time interval or continuously and are matched with corresponding desired values, wherein said corresponding desired values can be changed via an input interface and wherein deviations between the recorded parameters and the desired values detected by the data processing system are output via an output interface to an external device.

It can be understood that such a method can also be used for any other industrial or non-industrial process and is not limited to labelling processes only.

The described method provides possibility of a full monitoring of a specific process, preferably a labelling process. Beside the determination of values of specific process parameters also the analytical processing of the recorded values is part of the process by matching the recorded data with desired values. Via outputting of any deviation between the recorded values and the desired values a possibility for information of any suitable person like the machine operator or any technical device, which would be suitable to influence the deviation a possibility to react and influence just in time if any deviation occurs could be reached.

DETAILED DESCRIPTION OF THE INVENTION

In a preferred embodiment said control device is a separate device in itself comprising especially the data processing system, one or more interfaces as well as sensors or capabilities of connection for external sensors. It is of course additionally possible to get information about said deviations directly at the control device for example via a display or a signal light or the like as part of the control device but according to the invention it is intended that the external device, which is used to retrieve or receive data via the output interface from the control device is not part of the control device itself but rather a separate part. It is for example possible to provide a telemetric module as an output interface using for example a data transmitting via GSM/UMTS or any similar standard for digital cellular networks used by mobile phones and to use any mobile device working with the same standard and equipped with a corresponding software as external receiving device.

A further advantage is to record the amount and/or the temperature of the used adhesive via respective sensors, which are connected to said control device. Preferably, the amount of used adhesive is determined via weighting of the adhesive reservoir and via checking the difference in weight over a specific time. In addition or as an alternative, it could be advantageous to record the temperature of the adhesive with sensors at the reservoir and/or at the feed line and/or at the application device. In addition or as an alternative, it could be advantageous that the temperature of the adhesive is adjustable and controllable. Preferably, there are heating and/or cooling possibilities at the reservoir and/or the pipe and/or the application device. Preferably, the heating and/or cooling devices are connected to the control device. It is furthermore advantageous that the temperature is adjusted and controlled preferably automated by the data processing system of the control device, if any deviation between the recorded parameters and the desired values is detected.

Furthermore it could advantageous to record other suitable parameters of the adhesive and/or any other consumable supplies.

A further advantage is to record the number and/or the temperature of the objects to be labeled and/or the temperature of the objects already labeled via respective sensors, which are connected to said control device. Preferably, only the objects, which were effectively labeled, are counted. Preferably, especially the number of objects running through the labelling machine in a specific period are counted as well the amount of adhesive used during this period. Preferably, the amount of used adhesive is determined via weighing of the adhesive reservoir and via checking the difference in weigh over said period. It is furthermore imaginable that the data processing system builds a ratio of the recorded values and compares the ratio with desired values. In addition it is also possible to count the objects, which were effectively labeled especially without counting the objects with incorrect labeling or other waste.

A further advantage is to record especially the temperature of the air and/or the air humidity and/or the air pressure as environmental conditions of the environment of the labeling process are recorded via respective sensors, which are connected to said device. Preferably, any or all of said parameters of the environmental conditions are recorded via respective sensors at several different points of the environment of the labeling process like for example a factory workshop. Preferably, additional parameters are recorded via respective sensors, especially the temperature of the labelled object before or after the labelling process and/or the temperature of the adhesive as described above, wherein the data processing system could determine the probability of humidity or condensate on the objects and forward this determined probability via the output interface to the external receiving device and/or could adjust and/or control auxiliary means connected to the device and controllable by the data processing system to align the parameter of the environmental conditions with desired values. For example it could be possible to control via the device and the data processing system auxiliary means like for example heating devices, cooling devices, ventilation devices, air dehumidifier, air humidifier or the like, which could cause a change of said parameters.

A further advantage is to provide a visual surveillance and/or motion detection of at least parts of the room where the labeling process is carried out by respective sensors, which are connected to said control device, wherein the data acquired by said data processing system are aligned with corresponding desired values in a given time interval or continuously, wherein said corresponding desired values can be changed via an input interface and wherein deviations between the recorded parameters and the desired values detected by the data processing system are output via an output interface to an external device. Preferably, visual surveillance is provided by a picture sensor for example as part of a surveillance camera connected to the control device. Motion detection could be provided for example by a motions sensor connected to the control device.

The invention overcomes furthermore the identified disadvantages and solves the mentioned object by providing a monitoring system for monitoring a labeling process and especially for performing the method as described above. Therefore a further object of the invention is to provide said monitoring system, wherein the system comprises at least one sensor for recording parameters of the adhesive used for labeling and/or the objects to be labeled and/or of the environmental conditions of the environment of the labeling process, a control device comprising a data processing system; wherein the at least one sensor is connected to the control device, wherein desired values are recorded in a storage medium of the control device and/or the data processing system, wherein the data processing system processes the recorded parameters in a given time interval or continuously and matches them with the corresponding desired values, wherein the control device comprises an input interface to adapt and change the desired values of the data processing system as well as an output interface to output deviations between the recorded parameters and the desired values detected by the data processing system to an external device.

Preferably, the control device is a separate device in itself comprising especially the data processing system, one or more interfaces as well as sensors or capabilities of connection for external sensors. It is of course in addition possible to get information about said deviations directly at the control device for example via a display or a signal light or the like as part of the control device but according to the invention it is intended that the receiving device, which is used to retrieve or receive data via the output interface from the control device is not part of the control device itself but rather a separate part. It is for example possible to provide a telemetric module as an output interface using for example a data transmitting via GSM/UMTS or any similar standard for digital cellular networks used by mobile phones and to use any mobile device working with the same standard and equipped with a corresponding software as external receiving device.

Preferably, the monitoring system comprises especially at least any of the following sensors connected to the control device: a flow rate sensor to record the amount of fed adhesive; a weight sensor to record the weight of the adhesive in the reservoir; a temperature sensor to record the temperature of the adhesive at the reservoir and/or at the feed line and/or at the application device and/or at the label and or at the object and/or to record the temperature of the object especially at different locations and/or at different points in time; a hygrometer to get information about the humidity in the environment; a barometer to record the air pressure of the environment; a temperature sensor to record the temperature of the air of the environment; . . . In addition or as an alternative the monitor system can comprise a picture sensor for example as part of a surveillance camera connected to the control device to provide visual surveillance. In addition or as an alternative, the monitor system can comprise a motions sensor or the like connected to the control device for motion detection. It is also possible to use a picture sensor to check the position of the label or any other characteristic of the labeled object. Said position or characteristic is then processed by the control device as described above and any impact means could be activated and controlled by said control device if any deviation from any desired value is detected as described above.

Object of the invention is furthermore not only the monitoring system with all its parts but also the control device as a separate unit with the features as described below and above, comprising especially a data processing system, an output interface and an input interface.

A further advantage is that the monitoring system comprises auxiliary means, which are suitable to have an effect on any one of the parameters, which are recorded, wherein the auxiliary means a connected to the control device in a way, that the auxiliary means can be activated and controlled by the data processing system to have an effect on any one of the parameters via the data processing system if any deviation from a specific recorded parameter and the corresponding desired value is detected.

A further advantage is that the monitoring system comprises a plurality of sensors for a specific kind of parameter, to record this specific kind of parameter for example at different places of the environment of the labeling process like for example a factory workshop and/or at different points in time during the labelling process.

It is for example possible that the monitoring system comprises a plurality of sensors for example for detecting the temperature of the objects at different places and in particular in the environment of the labeling process like for example a factory workshop, or at different points in time during the labeling process, such as in the storage and/or at the beginning of the labeling process and/or immediately prior to adhesive application and/or label application and/or after the application of a label and/or at the finalization of the labeling when leaving the labeling machine. Furthermore the temperature of the adhesive can be recorded with sensors especially at the reservoir and/or at the feed line and/or at the application device and/or in the applied state on the label and/or on the object. Another example is the detection of environmental parameters, such as the temperature and/or the humidity and/or the air pressure in different areas of space in which the labeling takes place. Furthermore, it is imaginable to detect the temperature of the adhesive, in particular in a reservoir in a feed to an application device and/or immediately prior to application to the article or the label and/or in the applied state.

A further advantage is that the output interface of said monitoring system comprises or is a telemetric module to provide a possibility to output deviations between the recorded parameters and the desired values detected by the data processing system to an external device especially at a different location. Preferably, the output interface comprising a telemetric module uses preferably a data transmitting via GSM/UMTS or any similar standard for digital cellular networks used by mobile phones and to use any mobile device working with the same standard and equipped with a corresponding software as external device.

A further advantage is that the input interface of said monitoring system comprises or is a telemetric module to provide a possibility to adapt and change the desired values of the data processing system and/or adjust and/or control auxiliary means connected to the control device. Preferably, the output interface comprising a telemetric module uses preferably a data transmitting via GSM/UMTS or any similar standard for digital cellular networks used by mobile phones and to use any mobile device working with the same standard and equipped with a corresponding software as external device.

A further Object of the invention is an external device like an external receiving device and/or operating device suitable for the operation with said output interface and/or the input interface of the control device. Preferably, the external device comprises a telemetric module using preferably a data transmitting via GSM/UMTS or any similar standard for digital cellular networks used by mobile phones and to use any mobile device working with the same standard and equipped with a corresponding software as the input interface and/or the output interface of the control device. Preferably, the receiving device and the operating device are built as a single service device suitable to receive information sent via the output interface of the data processing system of the control device as well as sent information to the data processing system of the control device via the input interface. Preferably, the external device, like the receiving device and/or operating device and/or service device are equipped with a suitable software with regard to the software of the data processing system to provide a communication possibility.

A further advantage is that the external device provides a selection possibility especially based on a software for choosing a special input interface and/or control device and/or data processing systems out of a plurality of different ones. With such an external device it is possible to service different factory workshops at different locations.

BRIEF DESCRIPTION OF THE FIGURES

Preferred embodiments of the invention are described with the figures.

FIG. 1 shows a schematic representation of a monitoring system 1 for monitoring a labeling process. The labelling process is performed with a labeling machine 300 comprising an adhesive storage container 301 containing an adhesive 302. The adhesive 302 is delivered from the adhesive storage container 301 through a lining 303 to a dispensing device 304. A multitude of objects 206 are transported by a conveyor 305 through the dispensing device 304 to glue labels 307 onto the objects 306. These labeling machines 300 are well known to any person skilled in the art and are for example used in the food industry, especially to put labels onto any food object 306 by using an adhesive 302. This labelling machine 300 is not part of the monitoring system 1 but it is possible that the monitoring system 1 monitors any parameter of the labelling machine 300 as described later.

Figure 1:
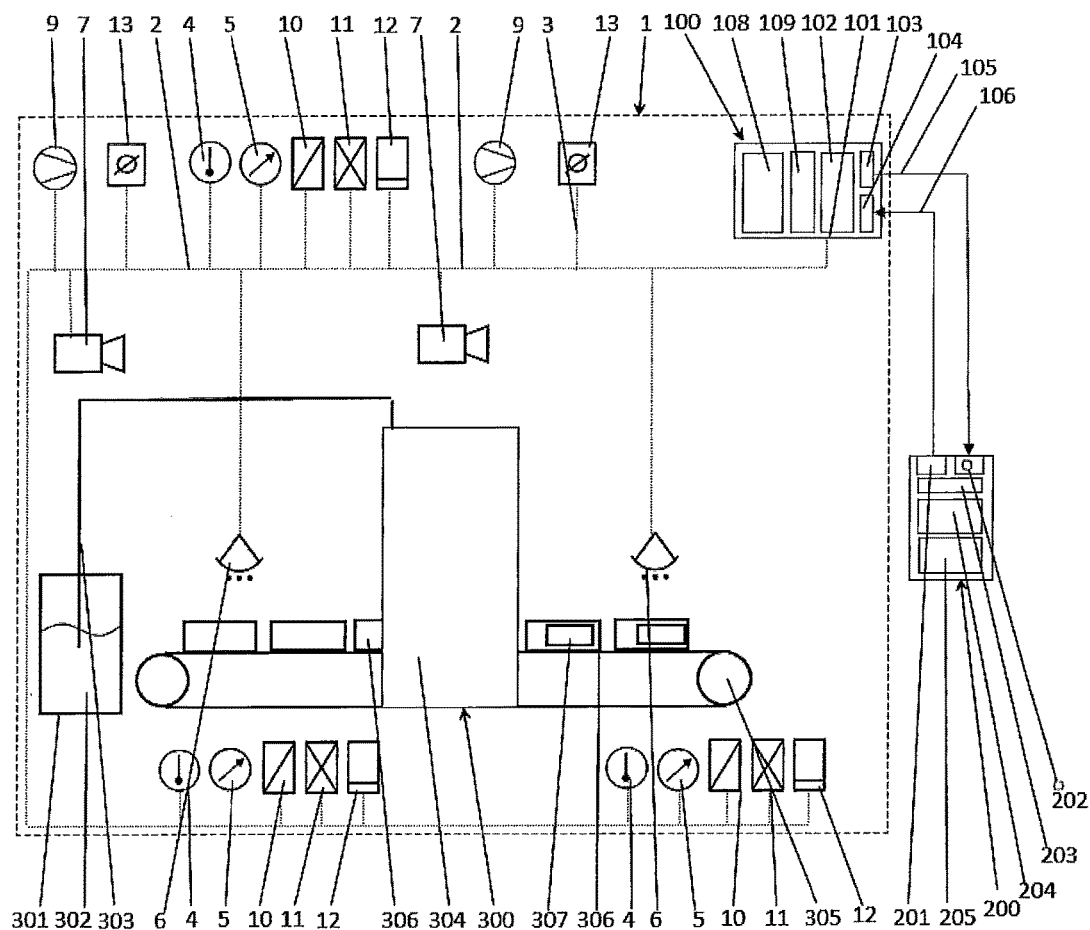
FIG. 1 shows a schematic representation of a monitoring system according to the invention.

The monitoring system 1 comprises a multitude of sensors for measuring the parameters especially of the objects 306 or the environmental conditions of the environment of the labeling process. There are for example thermometers 4, measuring devices 5 like hygrometers and barometers, a motion sensor 6 and cameras 7. These sensors are connected in each case via a connection 3 to a bus system 2, which is in turn connected via connection means 103 to a control device 100. The control device 100 comprises a data processing system 102, comprising especially a storage medium with a software, suitable to process the recorded parameters in a given time interval or continuously. The storage medium contains desired values of the parameters, which can be adapted and changed via an input device 109 used as an input interface. Furthermore, the control device 100 comprises a display 108 to get information especially about the desired values as well as of the recorded parameters. Said data processing system 102 matches said recorded parameters in a given time interval or continuously with said corresponding desired values to detect any deviation. To inform any machine operator or any other person about such a deviation the control device 100 comprises a telemetric output interface 103 to output deviations between the recorded parameters and the desired values detected by the data processing system 102 to an external device 200 used here as an external receiving device. In addition, the control device 100 comprises a telemetric input interface 104 to provide a possibility especially for the machine operator to intervene in case any deviation occurs especially via said external device 200, used here also as an external operating device. It is also possible to adapt and changed the desired values with said external device 200 via the telemetric input interface 104 or to read the recorded parameters. Both telemetric interfaces 103, 104 use a data transmitting via GSM/UMTS or any similar standard for digital cellular networks.

In order to intervene and to affect the parameters, the monitoring system 1 comprises in addition a multitude of auxiliary means like ventilation means 9, heating devices 10, cooling devices 11, humidifier and/or dehumidifier 12 and shutters 13 to affect the environmental conditions of the environment of the labeling process if any deviation of the desired values are detected by the control device 100. Said auxiliary means are also attached via connections 3 to the bus system 2 and further with the control device 100 in a way that the data processing system 102 could activate and control said auxiliary means to have an effect on any one of the parameters via the data processing system 102 if any deviation from a specific recorded parameter and the corresponding desired value is detected.

As shown in FIG. 1 a plurality of sensors for a specific kind of parameter is located in the area of space in which the labeling takes place or the room of the labeling process like for example a factory workshop and/or at different points in time during the labelling process. There is for example a first measuring unit comprising a thermometer 4, measuring devices 5 like hygrometers and barometers as well as a counter for the objects 306 entering the dispensing unit 304 at the starting point of the labelling process near to the unlabeled objects 306. There is especially a thermometer 4 for non-contact temperature measurement of the object 306 entering the dispensing unit 304. Furthermore there is a second measuring unit comprising especially a thermometer 4 as well as said measuring devices 5 at the end of the labelling process near to the labeled objects 306. A third measuring unit especially a thermometer 4 as well as said measuring devices 5 is placed distanced to the labelling machine 300 to get information about the parameters of the environment in this area. Every measuring unit is attached via the same bus system 2 to the control device.

In addition, auxiliary means units comprising especially heating devices 10, cooling devices 11 and humidifier and/or dehumidifier 12 are placed next to each measuring unit to affect the environmental conditions of the environment of the labeling process in each specific area. Further auxiliary means like said ventilation means 9 or shutters 13 are located at suitable areas in the room of the labeling process and could be controlled with the control device 1 to intervene and to affect the parameters. With the recorded parameters the data processing system 102 could determine especially the probability of humidity or condensate on the object 306 and forward this determined probability via the output interface 103 to the external device 200 and could adjust and control automatically the auxiliary means connected to the control device 100 and controllable by the data processing system 102 to align the parameter of the environmental conditions with desired values.

Furthermore a visual surveillance and motion detection is carried out via several cameras 7 as well as two motion sensors 6, in each case attached via connections 3 to the bus system 2 and further to the control device 100. The cameras 7 are used to observe the environment of the labeling machine. The motion sensor 6 is used to get information about any movement of the objects 306 through the labeling machine 300. All the data are recorded by the control device 100 and are matched by the data processing system 102 in a given time interval or continuously with said corresponding desired values to detect any deviation. For the machine operator it is also possible to retrieve data via the telemetric output interface 103 with the external unit 200, for example to provide a just in time visual surveillance possibility for the machine operator even if he is not on-site. It is also possible to provide a camera or any other device for optical surveillance connected via said bus system to said control device 100 to check the position of the label 307 or any other characteristic of the labeled object 306. Said position or characteristic is processed by the control device 100 as described above and any impact means could be activated and controlled by said control device 100 if any deviation from any desired value is detected as described above.

This monitoring system 1 as shown in FIG. 1 provides a possibility to monitor the labeling process via recording parameters of the objects 306 to be labeled and of the environmental conditions of the environment of the labeling process, wherein the recorded parameters are processed by said control device 100 in a given time interval or continuously and are matched with corresponding desired values, which are changeable via the input interface 104 or even the input unit 109 and wherein deviations between the recorded parameters and the desired values are output via said output interface 103 to the external device 200.

The external device 200 comprises said telemetric input interface 202 for retrieving data from the telemetric output interface 103 from the control device 100 as illustrated with the data flow 105 in FIG. 1. In addition, external device 200 comprise a data processing system 203, a display 204 as well as an input device 205. The data processing system 203 processes the data retrieved from the control device 100 for example to display any deviation detected by the control device 100 on the display 204. The machine operator can use said input device 205 to react on any deviation and to influence the deviation by sending a command to the control device 100 to start and control any of said auxiliary means. This command is processed by the data processing system 203 and sent via the telemetric output interface 201 of the external device 200 to the telemetric input interface 104 of the control device as illustrated with the data flow 106 in FIG. 1. Both telemetric interfaces 201, 202 uses the same data transmitting via GSM/UMTS or any similar standard for digital cellular networks as the telemetric interfaces 103, 104 of the control device. The communication between the control device 100 and the external device 200 is encrypted to prevent third parties from retrieving from or sending data to the control device 100.

In addition, the external device comprises a software based selection possibility for choosing a special monitoring system 1 or control device 100 out of a plurality of different ones to provide a possibility to use the external unit 200 with a plurality of monitoring systems 1 as described later.

Figure 2:
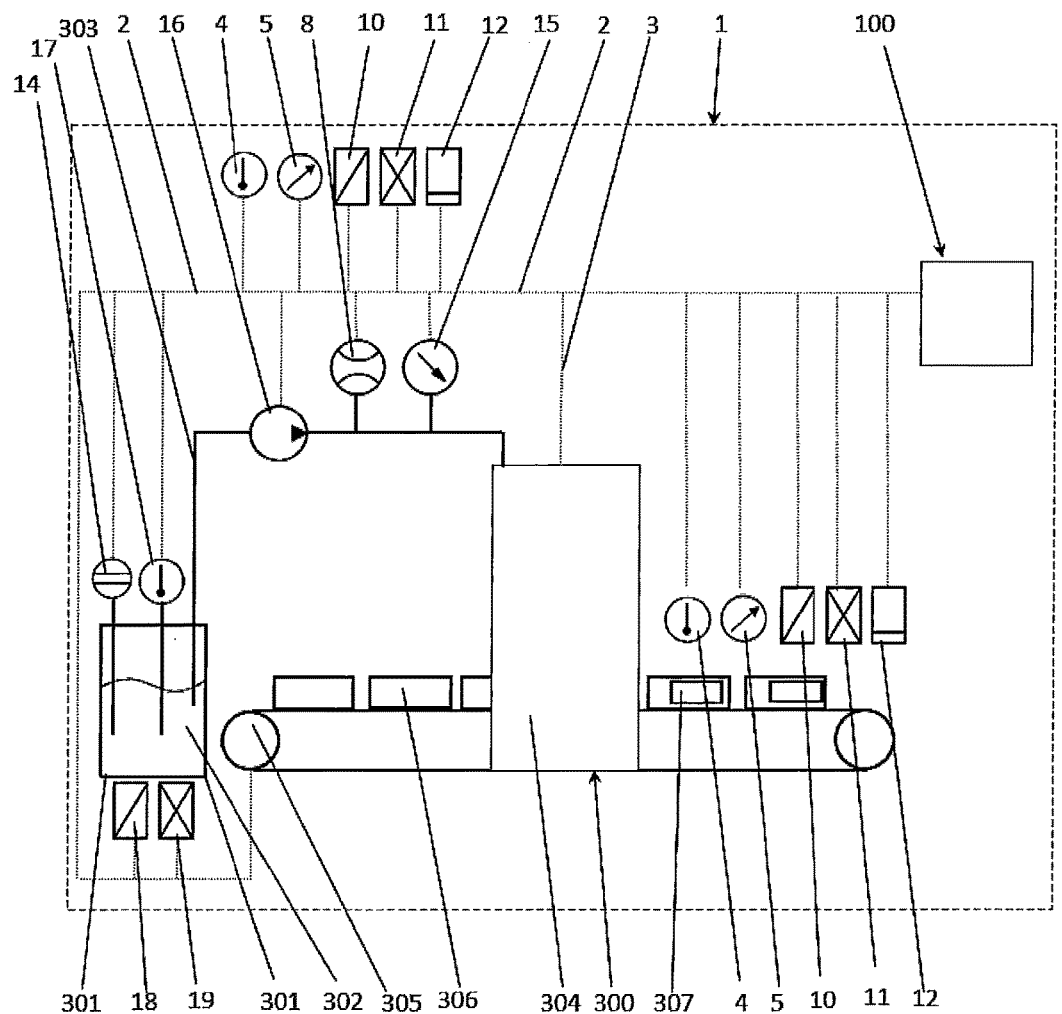
FIG. 2 shows a schematic representation of an alternative monitoring system according to the invention.

FIG. 2 shows a schematic representation of an alternative monitoring system 1 according to the invention. The monitoring system 1 has in general the same technical features as the monitoring system 1 shown with FIG. 1 and described above. Therefore, the description of the monitoring system 1 of FIG. 1 insofar completes the description of the monitoring system 1 shown with FIG. 2.

The monitoring system 1 is used for monitoring a labeling process, which is performed with a labeling machine 300 similar to the labeling machine 300 described above. The main difference is that the monitor system 1 comprise a plurality of sensors to get information not only of the environment but also of especially of the adhesive 302 as well as of the labeling machine 300 itself. Furthermore, the monitoring system comprises a plurality of auxiliary means to interact and influence said parameters.

There is for example a first measuring unit comprising a thermometer 4, and a level sensor 14 at the adhesive storage container 301 to get information about the temperature and of the level of the adhesive 302 in the adhesive storage container 301. It is possible to use a contact or a non-contact thermometer 4 at the adhesive storage container 301. There are also auxiliary means like an adhesive heating unit 18 as well as an adhesive cooling unit 19 to interact and influence said parameter of said adhesive 302. Furthermore, it is possible to control the refill of the adhesive storage container 301 in case a low filling level is recorded by said level sensor 14. Both thermometer 4 and level sensor 14 as well as said auxiliary means are connected via the same bus system 2 to the control device 100. So on the one hand the parameters are recorded by said control device 100 as described above and on the other hand said auxiliary means are controlled by said control device 100 to interact and influence said parameter of said adhesive 302.

Furthermore a flow rate sensor 8 as well a pressure gauge 15 is attached to the lining 303 to get further information about said adhesive 302 within said lining 303. Both flow rate sensor 8 and pressure gauge 15 are connected to said control device 100. The control device 100 could for example control a feed pump 16 for the adhesive 302 attached to the lining 303 after processing said recorded parameters. It is also possible to provide thermometers, especially to provide a contact measurement of the temperature of the adhesive 302 within the lining 303, or any other measuring device at the lining 303, which are not shown.

Further sensors and auxiliary means are contained within the dispensing unit 304 to get information especially about the adhesive 302 in any dispensing means and/or of the adhesive 302 and also of the environment at the time of the application. It is for example possible to provide a thermometer within the dispensing unit 304 for non-contact measurement of the dispensing means like an adhesive roller. Said sensors and auxiliary means are connected to the control device via a connection 3 as well as said bus system 2. In addition, the gear of said conveyor 305 is also connected via said bus system to the control device 100 so that the speed of the conveyor 305 can be controlled by the control device 100. A further measuring unit comprising especially a thermometer 4 as well as said measuring devices 5 containing especially a hygrometer, a barometer and also a counter for the objects 306 leaving the dispensing unit 304 is positioned at the end of the labelling process near to the labeled objects 306 to secure and influence the drying process of the adhesive 302 onto said objects 306 and to get information about the number of labelled objects 306. There is especially a thermometer 4 for non-contact temperature measurement of the object 306 leaving the dispensing unit 304. It is also possible to provide a camera or any other device for optical surveillance connected via said bus system to said control device 100 to check the position of the label 307 or any other characteristic of the labeled object 306. Said position or characteristic is processed by the control device 100 as described above and any impact means could be activated and controlled by said control device 100 if any deviation from any desired value is detected as described above.

It is also possible to provide further measuring units comprising especially thermometers 4 and/or measuring devices 5 like hygrometers and barometers or even a counter for the objects 306 entering the dispensing unit 304 at the starting point of the labelling process near to the unlabeled objects 306. In addition or as an alternative it is also possible to provide a measuring unit at the storage location for the unlabeled objects 306 and/or the labelled objects 306.

Figure 3:
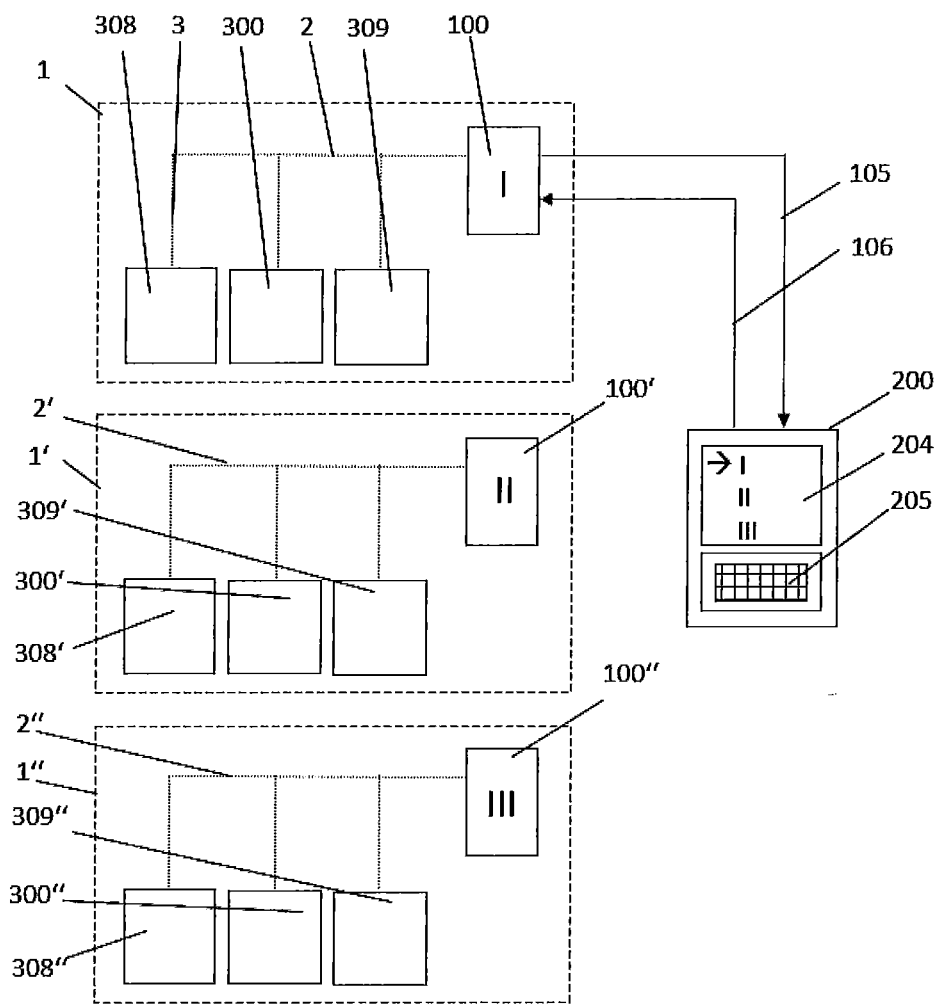
FIG. 3 shows a schematic representation of an external device as well as three monitoring systems.

FIG. 3 shows a schematic representation of an external device 200 as well as three monitoring systems 1, 1' and 1". All the monitoring systems 1, 1' and 1" have in general the same technical features as the monitoring systems 1 shown with FIG. 1 or 2 and described above. Therefore, the description of the monitoring system 1 of FIG. 1 or 2 insofar completes the description of the monitoring systems 1, 1', 1" shown with FIG. 3. All the monitoring systems 1, 1' and 1" are used for monitoring labeling processes with respective labeling machines 300, 300', 300" as described above. The respective unlabeled objects are stored in respective storage 308, 308', 300" and after the labeling process in a respective storage 309, 309', 309" for the labelled objects. Labeling machines 300, 300', 300", storages 308, 308', 308" as well as storages 309, 309', 309" are connected via respective bus systems 2, 2', 2" to the respective control device 100, 100', 100".

Each monitoring system 1, 1' and 1" provides a possibility to monitor the respective labeling process via recording any parameter as described above, wherein the recorded parameters are processed by the respective control device 100, 100', 100" in a given time interval or continuously and are matched with corresponding desired values, which are changeable by the user as described above and wherein deviations between the recorded parameters and the desired values are output as described above. Furthermore each monitoring system 1, 1' and 1" comprises besides said sensors for said parameters a plurality of auxiliary means especially controlled by the respective control device 100, 100', 100" in case any deviation of any desired value is detected to influence any of said parameters. The monitoring systems 1, 1' and 1" and the labeling machine 300, 300', 300" are placed at different locations for example different buildings or production sites.

Also shown is an external device 200 suitable for the operation with the control devices 100, 100', 100" via the respective input and output interfaces, which are not shown in FIG. 2. The external device 200 is built as described above and especially comprises a display 204 as well as an input device 205, in the current case a keyboard-like console. It is even possible to use the display 204 as input device 205, if a touch-screen is used.

The external device comprises a software based selection possibility for choosing a special monitoring system 1 or control device 100 out of a plurality of different ones to provide a possibility to use the external unit 200 with a plurality of monitoring systems 1, 1', 1". In the current case the monitoring system 1 with control device 100 marked with the roman numeral I is chosen by the user of the external device 200 via the input device 205 as shown in the display 204. The external device 200 retrieves data from the control device 100 as illustrated with the data flow 105 in FIG. 3 for example to display any deviation detected by the control device 100 on the display 204. The machine operator can use said input device 205 to react on any deviation and to influence the deviation by sending a command to the control device 100 to start and control any of said auxiliary means. This command is processed by the data processing system of the external device 200 and sent to the chosen control device 100 as illustrated with the data flow 106 in FIG. 3. The shown communication between the control device 100 and the external device 200 is wireless as described above and furthermore encrypted to prevent third parties from retrieving from or sending data to the control device 100.

| | |
|---|---|
| 1 | Monitoring system |
| 2 | Bus system |
| 3 | Connection |
| 4 | Thermometer |
| 5 | Measuring device |
| 6 | Motion sensor |
| 7 | Camera |
| 8 | Flow rate sensor |
| 9 | Ventilation means |
| 10 | Heating device |
| 11 | Cooling device |
| 12 | Humidifier/Dehumidifier |
| 13 | Shutter |
| 14 | Level sensor |
| 15 | Pressure gauge |
| 16 | Feed pump |
| 17 | Adhesive thermometer |
| 18 | Adhesive heating device |
| 19 | Adhesive cooling device |
| 100 | Control device |
| 101 | Connection means |
| 102 | Data processing system |
| 103 | Telemetric output interface |
| 104 | Telemetric input interface |
| 105 | Data flow |
| 106 | Data flow |
| 108 | Display |
| 109 | Input device |
| 200 | External device |
| 201 | Telemetric output interface |
| 202 | Telemetric input interface |
| 203 | Data processing system |
| 204 | Display |
| 205 | Input device |
| 300 | Labeling machine |
| 301 | Adhesive storage container |
| 302 | adhesive |
| 303 | lining |
| 304 | Dispensing device |
| 305 | Conveyor |
| 306 | Object |
| 307 | Label |
| 308 | Storage |
| 309 | storage |

The invention claimed is:

1. A method for monitoring a labeling process, comprising:
   (A) measuring parameters of an adhesive for labeling an object (306) to be labeled and/or environmental conditions of the labeling process, wherein the parameters are processed by a control device (100) comprising a data processing system (101) in a given time interval or continuously and
   (B) matching the parameters with desired values, wherein said desired values can be changed via an input interface (104, 109) and wherein deviations between the parameters and the desired values are detected by data processing system via an output interface (103) by digital cellular network to an external device (200).

2. The method for monitoring a labeling process according to claim 1, wherein said adhesive parameters include amount and temperature of the adhesive (302) measured via flow rate, level and adhesive thermometer sensors (8, 14, 17) which are connected to said control device (100).

3. The method for monitoring a labeling process according to claim 1, wherein the parameters of the objects (306) are recorded via a motion, camera, and thermometer sensors (6, 7, 4), which are connected to said control device (100).

4. The method for monitoring a labeling process according to claim 1, wherein the parameters for the environmental conditions include air temperature air humidity and air pressure are measured via thermometer, hygrometer, and pressure gauge, sensors (4, 5), which are connected to said control device (100).

5. The method for monitoring a labeling process according to claim 4, wherein the air temperature the air humidity, and the air pressure are measured at several different locations of the labeling process.

6. The method for monitoring a labeling process according to claim 4, wherein the air humidity the objects (306) are forwarded via the output interface (103) to the external device (200) and the desired values can be adjusted by auxiliary means selected from a thermometer, hygrometer, motion sensor, camera, flow rate sensor, level sensor, pressure gauge, adhesive thermometer, adhesive heating device, and adhesive cooling device (9, 10, 11, 12, 13, 18, 19) connected to the control device (100) and controllable by the data processing system (102).

7. The method for monitoring a labeling process according to claim 1, wherein a visual surveillance process is carried out by of motion sensor and camera (6, 7), which are connected to said control device (100), wherein the data acquired by the data processing system (102), wherein said desired values can be changed via an input interface (104, 109) and wherein deviations between the measured parameters and the desired values detected by the data processing system are output via the output interface (103) to the external device (200).

8. A monitoring system (1) for monitoring a labeling process according to claim 1 comprising at least one sensor selected from the group consisting of thermometer, hydrometer, motion sensor, camera, flow rate sensor, level sensor, pressure gauge, adhesive thermometer, adhesive heating device and adhesive cooling device (4, 5, 6, 7, 8, 14, 15, 17, 18, 19) for recording parameters of an adhesive (302) for labeling objects (306) to be labeled and/or the environmental conditions of the labeling process; a control device (100) comprising a data processing system (102);
   wherein the at least one sensor is connected to the control device (100),
   wherein the control device (100) and/or the data processing system (102) comprises desired parameters for the sensors,
   wherein the data processing system (102) processes the recorded parameters in a given time interval or continuously and matches the recorded parameters with corresponding desired values,
   wherein the control device (100) comprises an input interface (104, 109) to adapt and change the desired values of the data processing system (102) and an output interface (103) to output deviations between the recorded parameters and the desired values detected by the data processing system (102) to an external device (200).

9. The monitoring (1) system according to claim 8 comprising auxiliary means selected from ventilation means, heating device, cooling device, humidifier/dehumidifier, shutter, adhesive heating device or adhesive cooling device, (9, 10, 11, 12, 13, 18, 19) to control parameters, wherein the auxiliary means are connected to the control device (100).

10. The monitoring system (1) according to claim 8 comprising a plurality of sensors (4, 5, 6, 7, 8, 14, 15, 17, 18, 19) at various locations of the during the labelling process.

11. The monitoring system (1) according to claim 8, wherein said output interface (104) comprises a telemetric module to provide output deviations between the recorded parameters and the desired values detected by the data processing system (102) to an external receiving device (200) at a different location.

12. A monitoring system (1) according to claim 11, wherein said telemetric module uses a data transmitting via digital cellular networks and wherein the receiving device (200) and/or the operating device (200) is built as mobile device.

13. A monitoring system (1) according to claim 8 wherein said input interface (104) comprises a telemetric module to provide a possibility to adapt and change the desired values of the data processing system (102) and/or adjust and/or control the auxiliary means (9, 10, 11, 12, 13, 18, 19) connected to the control device (100) via an external operating device (200).

14. An external device (200) suitable for operation with the output interface (103) and/or the input interface (104) of the control device (100) of the monitoring system according to claim 8.

15. The external device according to claim 14 comprising a software for output and input interfaces (103, 104) control device (100) data processing system (102).

\* \* \* \* \*